United States Patent

Koleske et al.

[15] 3,670,045

[45] June 13, 1972

[54] ABA BLOCK POLYMERS OF POLYLACTONES AND POLYETHERS

[72] Inventors: Joseph Victor Koleske; Rene Marie-Joseph Roberts; Frank Paul Del Giudice, all of Charleston, W. Va.

[73] Assignee: Union Carbide Corporation, New York, N.Y.

[22] Filed: Dec. 30, 1970

[21] Appl. No.: 102,923

[52] U.S. Cl. ........................260/830 R, 260/13, 260/45.7 P, 260/45.8, 260/45.95, 260/78.3 R, 260/823, 260/860, 260/895, 260/896, 260/897 R, 260/898, 260/899
[51] Int. Cl. .....................................C08g 45/00, C08d 9/02
[58] Field of Search............................................260/823, 830

[56] References Cited

UNITED STATES PATENTS

| | | | |
|---|---|---|---|
| 3,203,920 | 8/1965 | Nikles | 260/830 |
| 3,222,312 | 12/1965 | Wyart | 260/830 |
| 3,242,104 | 3/1966 | Brueschweiler | 260/830 |
| 3,312,753 | 4/1967 | Bailey | 260/823 |
| 3,382,210 | 5/1968 | Wyart | 260/830 |
| 3,404,018 | 10/1968 | Hicks | 260/830 |
| 3,489,819 | 1/1970 | Busler | 260/823 |
| 3,598,799 | 8/1971 | Naylor | 260/823 |

*Primary Examiner*—Paul Lieberman
*Attorney*—Paul A. Rose, Aldo John Cozzi and Vincent P. Pirri

[57] ABSTRACT

The invention relates to novel, solid, substantially water-insoluble ABA block polymers in which the A blocks comprise recurring linear lactone units and the B block comprises recurring oxyethylene units. The block polymers have utility as plasticizers for polyvinyl chloride resins, as surfactants, and as dye assists for polypropylene fiber.

7 Claims, No Drawings

ABA BLOCK POLYMERS OF POLYLACTONES AND POLYETHERS

This invention relates to the preparation of novel block polymers characterized by an ABA structure.

U.S. Pat. No. 2,962,524 discloses that an admixture of lactones, monoepoxides, and a polyfunctional initiator such as polyols, polyamines, polycarboxylic acids, etc., in the presence of a Lewis acid catalyst, e.g., boron-trifluoride, can be polymerized to relatively low molecular weight oxy-alkylene-carbooxyalkylene polymers.

U.S. Pat. No. 3,312,753 discloses a process for preparing block copolymers which have a BA configuration. In this process, a monoepoxide monomer is charged to a reaction vessel under an inert atmosphere and which contains an organometallic catalyst of Group II or III until substantial homopolymerization of the monoepoxide compound has occurred. Thereafter an epsilon-caprolactone monomer is charged to the reaction vessel and the polymerization reaction is continued until such caprolactone monomer has been substantially homopolymerized as a polymer block or polymer section to the resulting block copolymer.

It has now been discovered that novel solid substantially water-insoluble block polymers characterized by an ABA structure and which have a broad spectrum of highly useful utilities described hereinafter can be prepared via a process which comprises reacting a molar excess of lactones with certain high molecular weight hydroxyl-terminated polyether compounds, preferably in the presence of stannous dialkanoate as the catalyst therefor, for a period of time sufficient to produce such novel solid block polymers. The reaction is believed to proceed by a mechanism whereby the lactone rings are opened to form linear lactone units which then successively add to the hydroxyl sites of the polyether reactant to form a recurring linear unit characterized by an oxy group at one end, a carbonyl group at the other end, and an intermediate group of from five to seven carbon atoms. Using epsilon-caprolactone as a reactant in the process of the invention, the resulting linear unit would be characterized by the formula $$-O(CH_2)_5\overset{O}{\underset{\|}{C}}-$$

The lactones which are contemplated in the preparation of the novel block polymers are those (i) which are composed of carbon and oxygen atoms, said oxygen being present in the form of the ester groups

(ii) which contain from five to seven carbon atoms in the ring nucleus which possess said ester group; (iii) which are free from ethylenic and acetylenic unsaturation; and (iv) which contain from zero to three alkyl substituents bonded to the carbon atoms of said ring nucleus.

Representative lactones include, by way of illustrations, epsilon-caprolactone; zeta-enantholactone; etacaprylolactone; and the alkyl substituted epsilon-caprolactones such as the monoalkyl-, the dialkyl- and the trialkyl-epsilon-caprolactones; e.g., the monomethyl-, the monoethyl-, the monohexyl-, the dimethyl-, the diethyl-, the di-n-propyl, the di-n-hexyl, the trimethyl-, the triethyl-, and the tri-n-propyl-epsilon-caprolactones; and the like. A single lactone monomer or mixtures of such monomers may be employed. Moreover, the corresponding hydroxyalkanoic acid may be employed in lieu of part or all of the lactone reactant. For example, one may employ 6-hydroxycaproic acid in place of epsilon-caprolactone.

The hydroxyl-terminated polyether compounds which are suitable for use in preparing the novel block polymers represent the products of the reaction involving from about 1.2 to about 1.5 moles of polyoxyalkylene glycols with about one mole of an organic diepoxy compound, in the presence of an aqueous sodium hydroxide solution, at moderately elevated temperatures, e.g., about 50° to about 125° C., for a period of time ranging from minutes to a couple of hours. The preparation of such hydroxyl-terminated polyether compounds is well documented in the art, for example, in U.S. Pat. No. 2,990,396.

Suitable hydroxyl-terminated polyether compounds are represented by Formula I below:

I
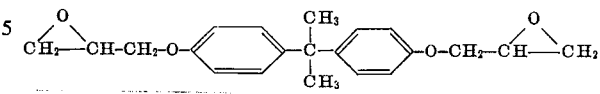

wherein R' is hydrogen, lower alkyl of one to three carbon atoms, phenyl, or mixtures thereof; wherein $m$ is an integer such that the average molecular weight of the polyoxyalkylene glycol chain is at least about 1,000, desirably from about 3,000 to 15,000, and preferably from about 4,000 to about 8,000; wherein $y$ has a value of from 2 to 5; and wherein Y represents the divalent group which results when both oxirane rings or the vicinal-epoxy groups, i.e.,

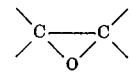

of an organic diepoxy compound are opened during the hydroxyl/oxirane reaction, said organic diepoxy compound being composed solely of carbon, hydrogen, and oxygen atoms, said oxygen being in the form of oxirane and optionally, ether and/or ester arrangements. For example, diglycidyl ether of 2,2-bis(4-hydroxy-phenyl)propane has the formula:

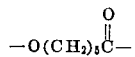

Upon reaction of this diepoxy compound with polyoxyalkylene glycol, as discussed previously, the divalent segment Y (of Formula I above) will thus have the following structure:

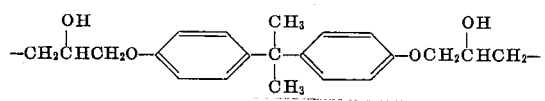

The organic diepoxy compounds suitable for use in preparing the hydroxyl-terminated polyether reactants are those composed of carbon, hydrogen, and oxygen atoms, the oxygen being present in the form of oxirane and optionally, ether and/or ester arrangements. Desirably, the diepoxy compounds include, for example, the bis(epoxyalkyl)cycloalkanes; the bis(epoxycycloalkyl) ethers, e.g., bis (2,3-epoxycyclopentyl) ether; the bis(epoxyalkoxy)benzenes, e.g., the bis(2,3-epoxypropoxy)benzenes; the bis(epoxyalkoxyphenyl)alkanes, e.g., the diglycidyl ether of 2,2-bis(4-hydroxyphenyl)propane; 3,4-epoxycyclohexylmethyl 3,4-epoxycyclohexanecarboxylate; 4-vinylcyclohexene diepoxide; and the like. The di(epoxyalkyl) diethers of dihydric phenols wherein the epoxyalkyl moiety contains from two to 20 carbon atoms are preferred, especially the diglycidyl diethers of 2,2-bis(4-hydroxyphenyl)propane, of hydroquinone, of biphenol, and the like. By the term "dihydric phenol" as used herein is meant that each of the two phenolic hydroxyl groups (—OH) is directly bonded to the same or different benzenoid nucleus.

The aforesaid polyoxyalkylene glycols which are significant in the preparation of the hydroxyl-terminated polyether reactants are conveniently represented by Formula II below:

II
$$HO-(R'C_2H_4O)_m-H$$

wherein the variables R' and $m$ have the meanings set out in Formula I supra. Preferred polyoxyalkylene glycols are the poly(oxyethylene) glycols, the poly(oxypropylene) glycols, and the poly(oxyethyleneoxypropylene)glycols.

The preparation of the novel block polymers may be accomplished via a non-catalytic process, though it is preferred to employ a stannous dialkanoate catalyst, especially those in which the alkanoate moieties contain from one to 20 carbon atoms. Specific catalysts are exemplified by stannous diacetate, stannous dibutanoate, stannous dioctanoate, stannous di(2-ethylhexanoate), stannous distearate, and the like. The catalyst which has been found to be particularly effective and for this reason preferred is stannous dioctanoate.

The catalysts are employed in a catalytically significant concentration. In general, a catalyst concentration in the range of from about 0.0001 and lower, to about 3, and higher, weight per cent based on the weight of total weight of reactants, is suitable. The reaction is conducted at an elevated temperature. In general, a temperature in the range of from about 50° C., and lower, to about 250° C. is suitable; a range from about 100° C. to about 225° C. is preferred. The reaction time can vary from several minutes to several hours, e.g., 24 hours or more, depending upon the correlation of variables such as temperature, choice of reactants, choice of catalyst, etc.

The reaction is preferably conducted in the liquid phase and under an inert atmosphere, e.g., nitrogen. Most desirably, the operative conditions are adjusted so as to achieve a practical and commercially acceptable reaction rate.

As indicated previously, the novel block polymers are believed to result from the ring opening of the lactone molecules and the successive addition of the resulting linear lactone units to the site of the primary hydroxyl group of the hydroxyl-terminated polyether reactant as illustrated in following Equation III below:

III

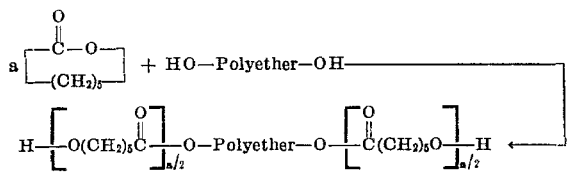

In Equation III above, the lactone reactant is illustrated by epsilon-caprolactone and HO POLYETHER OH represents the hydroxyl-terminated polyether reactant. The variable $a$ represents the number of molecules (or moles) of lactone per molecule (or mole) of hydroxyl terminated polyether compound. The method of invention has the advantage of permitting rather accurate control over the desired molecular weight of the novel block polymers since the reaction is substantially quantitative. This control is obtained by preselecting the molar proportions of lactone and polyether reactants in a manner that will be readily appreciated by those skilled in the art.

The novel solid, substantially water-insoluble block polymers which are obtained by the practice of the invention possess an ABA configuration and comprise:

1. A blocks or segments having the recurring linear unit represented below:

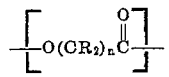

wherein R is hydrogen or alkyl which preferably contains from one to six carbon atoms, with the proviso that no more than 3 R substituents are alkyl groups; wherein $n$ is an integer having a value of from 5 to 7; and wherein said A blocks represent from about 15 to about 85 weight percent, preferably from about 30 to about 70 weight percent, based on the weight of the ABA block polymer;

2. a B block or segment defined by the structural formula represented below:

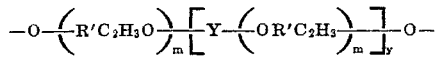

wherein R' is hydrogen or lower alkyl of one to three carbon atoms; wherein $m$ is a number such that ( $R'C_2H_3O$ ) has an average molecular weight of at least about 1,000, desirably from about 3,000 to about 15,000, and preferably from about 4,000 to about 8,000; wherein $y$ has a value of from about 2 to about 5, preferably from 2 to 3; wherein Y represents the divalent group which results when both vicinal-epoxy groups, i.e.,

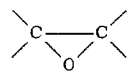

of an organic diepoxy compound are opened during the hydroxyl/oxirane reaction, said organic diepoxy compound being composed solely of carbon, hydrogen, and oxygen atoms, said oxygen being in the form of oxirane and optionally, ether and/or ester arrangements, and preferably in the form of oxirane and ether oxygen; and wherein said B block represents from about 85 to about 15 weight percent, preferably from about 70 to about 30 weight percent, based on the weight of the ABA block polymer;

3. wherein each terminal oxy moiety, i.e., —O—, of the B block shown above is separately and individually connected to the terminal carbonyl moiety of an A block through a monovalent bond to form an oxycarbonyl group,

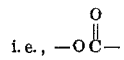

and 4. wherein said block polymer has an average molecular weight of from about 4,000 to about 100,000, preferably from about 25,000 to about 65,000.

In one suitable embodiment, the B block represents the product of the reaction of a polyoxyalkylene glycol which has an average molecular weight of from about 3,000 to about 15,000, preferably from about 4,000 to about 8,000, with a diglycidyl diether of a dihydric phenol, preferably of a bis(4-hydroxyphenyl)alkane such as 2,2-bis(4-hydroxyphenyl)propane, at a concentration of from about 1.2 to about 1.5 moles of said polyalkylene diol per mole of said diglycidyl diether compound, said B block having an average molecular weight of from about 9,000 to about 45,000, preferably from about 12,000 to about 24,000. Particular suitable polyoxyalkylene glycols are those in which the oxyalkylene moiety is oxyethylene, oxypropylene, or oxyethyleneoxypropylene. It is desirable that the B block represents from about 85 to about 15 weight percent and the A blocks represent from about 15 to about 85 weight percent based on the total weight of the novel polymer. Preferred novel block polymers are those in which the B block represents from about 70 to about 30 weight percent and the A block represents from about 30 to about 70 weight percent, based on the total weight of the block polymer.

The novel block polymers which are especially preferred are those in which the A blocks or segments comprise a recurring oxypentamethylenecarbonyl unit, i.e.,

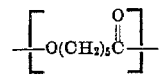

in which these recurring linear units are interconnected through the oxy group (—O—) of one unit with the carbonyl group

of a second unit. In different language, the interconnection of these units do not involve the direct bonding of two carbonyl groups, i.e.,

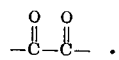

The terminal carbonyl group of the A blocks is monovalently bonded to the oxy group of the B block. The hydroxyl end group of the resulting novel block polymers, if desired, can be further reacted with carboxylic acids, anhydrides, isocyanates, epoxides, etc.

The novel block polymers have a myriad of important uses. They can be used as plasticizers for polyvinyl chloride resins; as additives in tape joint compounds to improve drying characteristics; as surfactants, and the like.

Greatly improved dyeability has been observed, quite unexpectedly, for shaped and molded articles, e.g., yarns, fibers, films, tapes, slit films, etc., which are formed from a blend of the novel ABA block polymer and synthetic polymer such as the crystalline olefin polymers, e.g., polyethylene, polypropylene, polybutene, poly(4-methylpent-1-ene), and the like; the acrylonitrile polymers, e.g., polyacrylonitrile, polymethacrylonitrile, and the like; the vinyl chloride copolymers, e.g., vinyl chloride/acrylonitrile copolymer, and the like; the cellulosic esters such as the cellulose acetates, the cellulose propionates, and the like; poly(ethylene terephthalate); and the like. This high absorption capacity for dyes, especially premetallized dyes, is achieved without any noticeable decrease in the mechanical properties such as tensile strength, modulus, elongation, and the like. For example, polyolefin fibers produced from blends of polyolefin and the novel ABA block polymer exhibit mechanical properties which are substantially the same as those obtained from the prevailing crystalline polyolefin per se but have improved dyeability, a higher moisture absorption capacity, etc.

The aforesaid blends are readily made by blending the selected amounts of ABA block polymer and olefin polymer with the application of heat and/or pressure in any suitable apparatus. It is usually necessary to apply sufficient heat to raise the polymers above their melting points. Suitable temperatures to be employed in blending the polymers are, for example, approximately 115° C. and higher, but not so high that significant decomposition of the polymers or other ingredients takes place. Temperatures as high as 180° to about 200° C. can be employed, if desired, although lower temperatures are usually suitable and economically preferred.

Suitable equipment for blending the polymers together include Banbury mixers, screw extruders, two-roll mills, etc. The time of blending or fluxing is not narrowly critical and a sufficient blending time to obtain a substantially uniform blend is usually satisfactory.

Illustrative times of blending are in the range of from about 1 to 2 minutes to 30 minutes or an hour. In the usual case, about 5 to 15 minutes is adequate. If desired, other materials can be added during blending operation such as plasticizers, antioxidants, light stabilizers, heat stabilizers, etc., and are of the usual types and are used in the usual amounts employed in alkene polymers such as polyethylene.

Thus, in a preferred embodiment, the invention relates to novel shaped and molded articles such as fibers, yarns, filaments, staple, tow, slit film, woven cloth, etc., which have improved dyeability characteristics and which are formed by blending a crystalline olefin polymer exemplified previously with/without cellulosics plus the novel ABA block polymer. In addition, differential dyeing can be accomplished by piece dyeing goods such as carpets and upholstry which are woven from unmodified fiber and a fiber previously blended with the novel ABA block polymer. Shaped and molded articles containing up to about 15 weight percent of ABA block polymer based on the total weight of ABA block polymer and olefin polymer, can be dyed to deep and vivid shades of color. In general, from about one to about 12 weight percent of ABA block polymer in the shaped and molded articles comprising comprising the crystalline olefin polymer and ABA block polymer can be dyed to a depth of color equivalent to that of wool dyed under similar conditions.

In a second preferred embodiment, the invention relates to novel shaped or molded articles having improved dyeability characteristics formed from a blend of crystalline olefin polymer such as polypropylene, novel ABA block polymer, and a dye assistant, preferably poly(vinyl pyridine). Additional dye assistants which can be employed include, for example, poly(vinyl pyrrolidone), poly(acrylic acid), and poly(ethyleneimine). These dye assistants can be added to the blend of solid olefin polymer and novel block polymer in an amount up to about 10 weight percent, and higher based on the total weight of the aforementioned two polymers.

The molded and shaped articles of the instant invention can be dyed by various methods. For example, the polymeric blends which make up the shaped and molded articles can be dyed in bulk form or else initially shaped into articles such as fibers achieved by spinning techniques and then dyed. These techniques are conventional in the art as shown in, for example, U.S. Pat. No. 3,312,755. The amount of dye which is used is that amount necessary to impart the desired shade of color. The shaped and molded articles of the instant invention can take up dyes in amounts up to about 5 weight percent, and higher, based upon the weight of the polymeric blend, but in many instances less than one to about 5 weight percent dye solution is generally sufficient to impart the desired shade of color.

The dyes which can be used with the shaped and molded articles include acid, disperse, basic, and premetallized dyes. It is especially with premetallized and disperse dyes that deep and vivid colors are, quite unexpectedly, obtained. Moreover, the affinity of such dyes to the aforesaid blends is achieved, as indicated above, without noticeable or detrimental effect on the properties of the shaped article, e.g., fibers, such as secant modulus, tensile strength, elongation, and the like.

Illustrative dyes are enumerated hereinafter. It is understood that the notation C.I. followed by a number refers to the Color Index assigned to dyes originally by the British in 1924 and subsequently updated in an attempt to specifically characterize dyes where possible. Other dyes can be found listed in the Encyclopedia of Chemical Technology, pages 327–445, Interscience Publisher, (1950). Among the premetallized dyes include, for instance, Cibalan Yellow GRL, Cibalan Yellow 2BRL, Cibalan Yellow FGL, Cibalan Brown 2GL, Cibalan Scarlet GL, Cibalan Red 2GL, Cibalan Orange RL, Cibalan Blue FBL, Cibalan Blue BL, Cibalan Blue BRL, Cibalan Blue 3GL, Capracyl Yellow GW, Capracyl Brown RD, Capracyl Red B, Capracyl Blue 3G, and Capracyl Red G. Typical acid dyes are Formyl Violet S4B (C.I. 698), Martius Yellow (C.I. 9), Fast Red A(C.I. 176), Milling Orange (C.I. 274), Naphthol Green B(C.I. 5), Wood Green S (C.I. 737), Patent Blue A (C.I. 714), Violamine R (C.I. 758), Alizarin Saphinol B (C.I. 504), Alizrin Red S (C.I. 1034), Grumpsall Yellow (C.I. 197), Diamond Black F (C.I. 229), Callocyanine (C.I. 833), Eriochrome Azrol B (C.I. 720), Naphthol Green Y (C.I. 2), Naphthazarin (C.I. 1019), Coerulein (C.I. 783), and Solid Yellow 2G. Exempliary basic dyes are Rhodamine B (C.I. 749), Auramine (C.I. 655), Crystal Violet (C.I. 681), Safranine (C.I. 841), Methylene Blue (C.I. 922), Nile Blue A(C.I. 913), Acridine Orange NO (C.I. 788), Sevron Blue 5G (C.I. 51004) and Sevron Red GL. Disperse dyes can be typified by Celliton Fast Red GGA (C.I. 11210), Celliton Fast Black BA, and DuPont Victoria Green.

Of course, various additives such as carriers can be contained in the dye bath in order to secure a more rapid dyeing operation. The additive will be dependent upon the type of dye used and the selection is well within the ability of those skilled in this art.

The following Examples are illustrative. Unless otherwise specified, all percentages and parts are by weight.

The term "reduced viscosity," as is well known, is a value which also can be obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of benzene ( or other common organic solvent such as cyclo-hexanone, toluene, chloroform, etc.) at 30° C.

The novel ABA block polymers prepared in accordance with the teachings disclosed herein are substantially water-insoluble, that is to say, not more than 25 weight percent of a given specimen of ABA block polymer can be dissolved in water maintained at 95° C. for one hour.

Crude fibers were prepared by blending a general purpose crystalline polypropylene having a melt flow of 12.0 and a Melt Index range of 5–50 at a temperature range of 150° to 300° C. and the novel block polymer on a two roll mill for several minutes, e.g., 5 to 60 minutes, at an elevated temperature, e.g., about 140° to 180° C. During the milling operation, about 0.5 weight percent of both ultra-violet and thermal stabilizers, i.e., diphenylpentaerythritol diphosphite and 2-(2'-hydroxy-3',5'-di-tert.butyl)-5-chlorobenzaltriazole (Tinuvin 327), were added. The cooled mill stock was then shaved with an electric drill and a 5/16-inch Speed Bore bit to prepare crude fibers for dyeing studies. The crude fibers were placed in the dye baths and dyed in a boiling water bath for one hour. After this period of time the fibers were separated by filtration, washed, and then scoured. The scouring was accomplished by placing the dyed fibers in about 50 milliliters of distilled water that contains one milliliter of a one percent aqueous soda ash solution and one milliliter of one percent aqueous nonionic surfactant solution such as those prepared by the ethoxylation of a $C_{11}$–$C_{15}$ linear alkanol with about 7 moles of ethylene oxide. The amounts of the various components of the scouring bath are per gram of fiber. The fibers were then scoured for 15 minutes in a boiling water bath, filtered, dried and the color evaluated.

The dye solutions employed to dye the aforesaid crude fibers are as follows:
  i. When disperse dyestuffs are employed . . . . For each gram of fiber, 5 milliliters of a one percent aqueous dye solution and 0.5 milliliter of nonionic surfactant are added to about 50 milliliters of distilled water.
  ii. When acid dyestuffs are employed. . . . For each gram of fiber, 5 milliliters of a one percent aqueous dye solution, 4 milliliters of an aqueous two percent $H_2SO_4$ solution, and 0.5 milliliter of a nonionic surfactant are added to about 50 milliliters of distilled water.
  iii. When premetallized dyestuffs are employed. . . For each gram of fiber, 5 milliliters of a one percent aqueous dye solution, 2 milliliters of an aqueous 2 percent DAP solution and 0.5 milliliter of a nonionic surfactant are added to about 50 milliliters of distilled water.
  iv. When basic dyestuffs are employed . . . . For each gram of fiber, 5 milliliters of a one percent aqueous dye solution and 0.5 milliliter of nonionic surfactant are added to about 50 milliliters of distilled water.

The nonionic surfactant employed in the above dye solutions are prepared by the ethoxylation of $C_{11}$–$C_{15}$ linear alkanols with about 12 moles of ethylene oxide.

In the illustrative Examples herein blends of a general purpose crystalline polypropylene and novel block polymers (about 5 to 10 weight percent) are also spun into multifilament fibers, knit into fabric, stretched, dyed, scoured, and tested for light, wash, and dry cleaning fastness. The experimental dyeing and procedure was as follows:

The fabrics to be dyed were prescoured in a solution of 1.0 weight percent nonionic surfactant (ethoxylation product of nonylphenol and 40 moles of ethylene oxide) and 2.0 weight percent trisodium polyphosphate for 20 minutes at 160° F. After prescouring the fabrics are rinsed in distilled water. The dyestuff was mixed to the desired concentration and 0.5 weight percent of the abovesaid nonionic surfactant added. The dyebath was set 120° F. to start and then raised to about 210° F. over a 30-minute period. The samples are then run 60 to 90 minutes at about 210° F. After dyeing, the samples were afterscoured in a solution of 0.25 gm/liter of a similar anionic surfactant (ethoxylation product of nonylphenol and 10.5 moles of ethylene oxide) and 0.25 gm/liter of soda ash for 20 minutes at 160° F., then rinsed and dried.

The fastness procedures were as follows:

| Wash Fastness | American Association of Textile Chemists and Colorists, AATCC, Test Method 61–1968–11A |
|---|---|
| Fastness | AATCC Test Method 85–1968 |
| Light Fastness | AATCC Test Method 16A–1964 |

EXAMPLE 1

To a reaction vessel containing 1,000 grams of a polyoxyethylene glycol having an average molecular weight of approximately 6,000 heated to about 65° C. in a nitrogen atmosphere, there were added 8.87 grams of aqueous 50 percent sodium hydroxide solution. The resulting admixture was stirred until solution resulted. Thereafter a 109 gram portion of this solution was transferred to another vessel and heated to 95° C. in a nitrogen atmosphere, and 2.88 grams of diglycidyl ether of 2,2-bis(4-hydroxyphenyl)propane were quickly added, with stirring. This amount corresponds to a molar ratio of 0.5:1 of the diglycidyl ether to the polyoxyethylene glycol. Thereafter the temperature was held within the range of 95° to 110° C. for 40 minutes, and the reaction mixture was allowed to cool to room temperature and solidify. The solid material was a tan-colored wax which melted at 60° C. A solution of 50 grams of this material in 150 grams of water contained only traces of gel and had a viscosity at 30° C. of 913 centipoises.

EXAMPLE 2

Three hundred grams of epsilon-caprolactone and three hundred grams of the hydroxyl-terminated polyether compound of Example 1 supra were added to a 1,000 milliliter, 4-neck flask, equipped with a thermometer and stirrer. The system was sparged with nitrogen, heated to 120° C., and again sparged for about an hour with nitrogen. Thereafter 0.3 gram of stannous dioctanoate was added and the resulting reaction mixture heated to 180° C. and held at this temperature for 10 hours. During the entire period, the reaction mixture was maintained under nitrogen. When cooled to room temperature, there was obtained an opaque, white crystalline, polymeric product. Thereafter, this polymeric product was heated to 180° C. and held at this temperature for one hour under vacuum, e.g., about 1 mm. of Hg. About 15–20 grams of material was removed by this procedure. The polymeric product was cooled to room temperature, dissolved in benzene, and precipitated and washed with hexane. There was obtained 575 grams of a fine white powdery block polymer having an ABA configuration in which the A blocks are recurring oxypentamethylenecarbonyl units and the B block conforms to Formula I supra (sans the terminal hydroxylic hydrogen atoms) in which R' is hydrogen, y equals 2, and Y represent the divalent group which results when both oxirane rings of diglycidyl ether of 2,2-bis(4-hydroxylphenyl)propane are opened (during the hydroxyl/oxirane reaction).

To test water solubility, 6.6 of the block polymeric product was placed in 70.2 grams of distilled water and stirred overnight. After settling an aliquot of the supernatant liquid, i.e., 6.9 grams, was removed and dried to constant weight. The residue weight 0.027 gram indicated that virtually no part of the block polymeric product was water soluble reconfirming that the desired reaction had taken place.

EXAMPLE 3

Thirty grams of epsilon-caprolactone and 450 grams of the hydroxyl-terminated polyether compound of Example 1 supra were added to a 1,000 milliliter, 4-neck flask, equipped with a thermometer and stirrer. The system was sparged with nitrogen, heated to 120° C., and again sparged for about an hour with nitrogen Thereafter 0.24 gram of stannous dioctanoate was added and the resulting reaction mixture was heated to 180° C. and held at this temperature for 24 hours. The procedure of Example 2 supra was then followed. No residue was collected while heating the block polymeric product under vacuum. The resulting block polymeric product was water-soluble.

EXAMPLE 4

Five parts by weight of eta-caprylolactone and 10 parts by weight of the hydroxyl-terminated polyether compound of Example 1 were added to a reaction vessel. Stannous dioctanoate (0.075 part by weight) was added thereto. The vessel then was placed in an oil bath maintained at 180° C. for a period of 24 hours. Upon cooling to room temperature the resulting reaction product mixture was dissolved in benzene, followed by precipitation and washing with hexane, and then dried in a vacuum oven at room temperature for 3 days. The yield of block polymeric product having an ABA configuration was greater than 93 percent.

EXAMPLE 5

In a manner similar to Example 4 supra, when 20 parts by weight of methyl-epsilon-caprolactone are used in lieu of the 5 parts by weight of eta-caprylolactone, there is obtained a water-insoluble block polymer.

EXAMPLE 6

To a reaction vessel containing 3 moles of polyoxy-ethylene glycol having an average molecular weight of approximately 4,000 heated to about 90° C. in a nitrogen atmosphere, there were added 3 moles of aqueous 50 percent sodium hydroxide solution. The resulting admixture was stirred until solution was effected. Thereafter 1.5 moles of diglycidyl ether of hydroquinone were quickly added with stirring. The temperature was held at about 105° C. for 1.5 hours. The resulting reaction product mixture was allowed to cool to room temperature. There was obtained a solid polyether product having hydroxyl termination.

EXAMPLE 7

Two hundred grams of epsilon-caprolactone and 150 grams of the hydroxyl-terminated polyether compound of Example 6 supra were added to a reaction vessel which was sparged with nitrogen, heated to 120° C., and again sparged for about an hour with nitrogen. Thereafter 0.20 gram of stannous dioctanoate was added and the resulting reaction mixture was heated to 180° C. under nitrogen and held at this temperature for 8 hours. When cooled to room temperature, there was obtained a water-insoluble solid block polymeric product.

EXAMPLE 8

To test the dyeability of crystalline polypropylene without the novel block polymers as dye assistants, 20 parts of polypropylene was milled with 0.1 part UV stabilizer and 0.1 part thermal stabilizer on a two-roll mill for five minutes at 170° C. Milling behavior was described as good. Crude fibers were then prepared and dyed and scoured as noted in the procedure prior to the Examples. The results are set out in Table I below:

TABLE I

| Dyestuff | Type Dyestuff | Color |
| --- | --- | --- |
| Celliton Fast Red GGA | Disperse | Red Tint |
| Latyl Orange 3R | Disperse | Orange Tint |
| Eastman Fast Yellow GLF | Disperse | Yellow Tint |
| Eastman Polyester Red 2G | Disperse | Red Tint |
| Capracyl Red B | Premetalized | No Color |
| Xylene Milling Blue BL | Acid | No Color |
| du Pont Milling Red | Acid | No Color |
| Amacid Milling Brown | Acid | No Color |
| Sevron Blue 5G | Basic | No Color |

EXAMPLE 9

Eighteen grams of crystalline polypropylene and two grams of the novel block polymer of Example 3 supra were blended on a two-roll mill for five minutes at 170° C. Ultra-violet stabilizer (0.1 gram) and thermal stabilizer (0.1 gram) were added to the blend during the milling operation. Milling behavior regarding fluxing, banding, bank, roll, release, dispersion, and hot strength were described as good. Crude fibers were then prepared, dyed, and scoured as described previously. Results are set out in Table II below:

TABLE II

| Dyestuff | Type Dyestuff | Color | Depth of Color |
| --- | --- | --- | --- |
| Celliton Fast Red GGA | Disperse | Red | Deep |
| Latyl Orange 3R | Disperse | Orange | Deep |
| Eastman Fast Yellow GLF | Disperse | Yellow | Deep |
| Eastman Polyester Red 2G | Disperse | Red | Medium |
| Capracyl Red B | Premetalized | Red | Deep |
| Xylene Milling Blue BL | Acid | Blue | Deep |
| duPont Milling Red | Acid | Red | Medium |
| Amacid Milling Brown | Acid | Brown | Medium |
| Sevron Blue 2G | Basic | Blue | Medium |

EXAMPLE 10

A. Epsilon-caprolactone (75 grams) and the hydroxyl-terminated polyether product (300 grams) of Example 1 supra were reacted in the manner set out in Example 2 supra, with the exceptions that 0.19 gram of stannous dioctanoate was employed and the reaction conditions were 24 hours at 180° C. The resulting novel block polymer was a white crystalline powder.

B. Crystalline polypropylene (18 grams) and two grams of the above block polymer were blended on a two-roll mill for 5 minutes at 170° C. Ultra-violet stabilizer (0.1 gram) and thermal stabilizer (0.1 gram) were added to the blend during the milling operation. Milling behavior regarding fluxing, banding, bank, roll, release, dispersion, and hot strength were described as good. Crude fibers were then prepared, dyed, and scoured as described previously. The dye-stuffs used and the results of the dyeing and scouring operation were the same as stated in Example 9.

EXAMPLES 11–15

A. Five experiments using various lactone reactants (7.5 grams) and the hydroxyl-terminated polyether compound (7.50 grams) of Example 1 supra were conducted in the presence of 0.5 weight percent stannous dioctanoate (based on the total weight of reactants). The procedure and conditions employed is set forth in Example 4 supra. The block polymeric products were then blended with crystalline polypropylene as described in paragraph B below.

B. Ninety parts of crystalline polypropylene, and 10 parts of each of the block polymers of paragraph A, 0.005 part UV stabilizer, and 0.005 part thermal stabilizer were blended on a two-roll mill at 170° C. for 5 to 10 minutes. All aspects of the milling operation were rated as good. From these blends, crude fibers were prepared, dyed and scoured as described previous. Additional pertinent data are set out in Table III below:

TABLE III

| Ex. No. | Lactone | Yield of polymer [1] | $I_r$, dl./ gm.[2] | Capracyl Red B premetalized [3] |
|---|---|---|---|---|
| 11 | Epsilon-phenyl-epsilon-capro-lactone. | 92 | 0.16 | Deep red. |
| 12 | Epsilon-methyl-epsilon-capro-lactone. | 94 | 0.23 | Do. |
| 13 | Gamma-methyl-epsilon-capro-lactone. | 91 | 0.21 | Do. |
| 14 | Gamma-octyl-epsilon-capro-lactone. | 58 | 0.24 | Do. |
| 15 | Gamma-tertiary-butyl-epsilon-caprolactone. | 64 | 0.22 | Do. |

[1] Yield are all minimal values since some produce was lost during the purification procedure; weight percent.
[2] All reduced viscosities were determined in benzene at 30° C. and at a concentration of 0.2 gm./dl.
[3] Result of dyeing and scouring crude fibers, color and shade depth of color.

EXAMPLES 16–19

Four ABA block polymers were prepared from epsilon-caprolactone and the hydroxyl-terminated polyether compound of Example 1 supra. The equipment and procedure is similar to that described in Example 2 supra except that the reaction time is 24 hours. Other pertinent data are set out in Table IV below.

TABLE IV

| Example No. | Amount of ε-caprolactone, gm. | Amount of polyether compound, gm. | Reduced viscosity [1] | Weight percent ε-caprolactone | Water soluble [2] |
|---|---|---|---|---|---|
| 16 | 198.0 | 402.0 | 0.34 | 30.8 | No. |
| 17 | 300.0 | 300.0 | 0.33 | 47.6 | No. |
| 18 | 380.0 | 210.0 | 0.37 | 63.1 | No. |
| 19 | 480.0 | 120.0 | 0.40 | 77.4 | No. |

[1] Reduced viscosities were determined in benzene at 30° C. and a concentration of 0.2 gm./dl. Values are in dl./gm.
[2] Visual observation of solubility in distilled water at a concentration of 2% by weight.

EXAMPLES 20–23

This example demonstrates the effectiveness of the novel block polymers as dye assistants for cellulose triacetate. The cellulose triacetate used was Arnel fibers (Celanese Corporation) and were described as 200 denier, filament 52, 5H luster, type bright. These fibers were scoured in isopropanol to remove any lubricant that might be on fiber and dried.

Various solutions of cellulose triacetate and the block polymer of Example 2 in methylene chloride were prepared. These solutions were clear and homogeneous. Thin films were made by separately spreading the solutions on glass plates and air drying. The films were clear indicating a compatible system. Small discs about one-inch in diameter were then cut from the films and these were dyed with various classes of dyes. The films were dyed and scoured in the manner described previously. The data showed that blends of block polymer and cellulose acetate enhanced dyeability with disperse dyestuffs and imparts dyeability with premetalized, acid, and basic dye-stuffs without noticeably altering various properties of cellulose triacetate. Additional data are set out in Table V.

EXAMPLES 24–27

An ABA block polymer in which the A blocks represented 55 weight percent and the B block represented 45 weight percent was prepared in the manner set out in Example 2 supra using epsilon-caprolactone and the hydroxyl-terminated polyether compound of Example 1 supra. Blends of crystalline polypropylene, the aforesaid ABA block polymer, UV stabilizer, and thermal stabilizer were then prepared on a two-roll mill at 165° C. using a 15 minute mixing time. The amounts of materials used for the various compositions spun are given in Table VI below. All aspects of the milling behavior (fluxing, banding, bank, roll, release, dispersion, and hot strength) were considered to be good by the mill operator. These blends were sheeted from the mill, cooled, and chipped in a granulator. The chipped blends were then dried at 80° C. in a vacuum oven for about 16 hours.

Miltifilament yarns were melt spun at 280° C. from these blends on a spinning machine using a 25-hole × 0.030 inch spinnerette, a ¼-inch sand-pack as a filter, and a pump speed of 39 revolutions per minute. The melt draw ratio was 140 to 1. As shown in Table VI, the spinning pressure was markedly less with the dye assistant present. This factor permits faster spinning (higher through-put) and longer filter pack and spinnerette life.

A small amount of each of the spun fibers was stretched 245 percent (feed rate of 100 feet per minute and a takeup rate of 345 feet per minute) using 20 psi steam. These cold drawings were not done at maximum stretch.

The tensile properties (average of five tests) of the oriented fibers were determined on 10-inch gauge length samples at an extension rate of 6 inches per minute. The extension is taken as the extension at which the first filament break occurs after which break the load being applied does not increase.

Samples of the oriented fibers were then knit into tubes and dyed at the boil using 5 percent dyestuff on the weight of the fiber with three premetallized dyestuffs (Cibalon Yellow 2BRL, Cibalon Blue FBL, and Capracyl Red B). As was expected, the control was only stained with these dyestuffs. The samples containing the ABA block copolymer showed excellent affinity for the dyestuffs with the depth of color depending on the amount of ABA in the fiber. Both the 7.5 weight percent and 10.0 weight percent ABA polymer levels produced deep shades. The 7.5 weight percent ABA polymer level fabric was dyed with two disperse dyestuffs (Celliton Fast Red GGA and Celliton Fast Black BA) and showed excellent dye affinity; with two basic dyestuffs (Sevron Brown and Sevron Blue 5G) and showed good dye affinity; and with two acid dyestuffs (Xylene Milling Blue BL and Xylene Milling Red 3B) and showed fair dye affinity. Additional data are set out in the Table VI supra.

TABLE V

| Example number [1] | Cast film [2] | Dyeing and scouring results | | Color and depth | | | | |
|---|---|---|---|---|---|---|---|---|
| | | Xylene Milling Blue BL. acid | Sevron Blue 5G, basic | Celliton Fast Red GGA disperse [3] | Capracyl Red B, premetalized | Cibalon Red 2 GL, premetalized | Irgalan Blue FBL, premetalized | Lanasyn Olive 2 GL, premetalized |
| 20 | [4] 100/0 | No color | Blue tint | Red, medium | No color | No color | No color | No color. |
| 21 | [5] 95/5 | Blue tint | Light blue | Red, darker | Red tint | Light red | Light blue | Green tint. |
| 22 | [6] 90/10 | Medium blue | Medium blue | do | Medium red | Medium red | Medium blue | Light green. |
| 23 | [7] 85/15 | Dark blue | Dark blue | Red, very deep | Deep red | Deep red | Deep blue | Deep green. |

[1] In Examples 20–23, a total of 100 parts of cellulose triacetate and block polymer were dissolved in 600 parts of methylene chloride. The four resulting solutions were then cast to prepare films.
[2] Example 20: Cellulose triacetate—100 parts; Block polymer—0 parts.
Example 21: Cellulose triacetate—95 parts; Block polymer—5 parts.
Example 22: Cellulose triacetate—90 parts; Block polymer—10 parts.
Example 23: Cellulose triacetate—85 parts; Block polymer—15 parts.
[3] Regarding colors and depth with Celliton Fast Red GGA, a dispersed dye, the control (Example 20) was rated medium rather arbitrarily since it was a good red color. However, each increase in the amount of block polymer increased the depth of color quite noticeably.
[4] 1% secant modulus, 260,000 p.s.i., tensile strength, 11,000 p.s.i.
[5] 1% secant modulus, 220,000 p.s.i., tensile strength, 9,600 p.s.i.
[6] 1% secant modulus, 240,000 p.s.i., tensile strength, 10,000 p.s.i.
[7] 1% secant modulus, 280,000 p.s.i., tensile strength, 9,000 p.s.i.

TABLE VI

|  | Example No. 24 | Example No. 25 | Example No. 26 | Example No. 27 |
| --- | --- | --- | --- | --- |
| Polypropylene: Parts | 100.0 | 95.0 | 92.5 | 90.0 |
| ABA Block Polymer Parts | 0.0 | 5.0 | 7.5 | 10.0 |
| UV Stabilizer: Parts | 0.5 | 0.5 | 0.5 | 0.5 |
| Thermal Stabilizer: Parts | 0.5 | 0.5 | 0.5 | 0.5 |
| Spinning Temp. °f. | 280°C | 280°C | 280°C | 280°C |
| Spinning Press. psig | 600–800 | 350 | 300 | 250 |
| Denier | 165 | 178 | 182 | 183 |
| Tenacity, gpd | 3.19 | 3.33 | 3.12 | 2.95 |
| Elongation, % | 42.4 | 78.7 | 88.4 | 70.9 |
| Stiffness Mod., gpd | 37.3 | 40.4 | 37.1 | 35.1 |

What is claimed is:

1. The solid, substantially water-insoluble block polymers possessing an ABA structure comprising:

i. A blocks having the recurring unit:

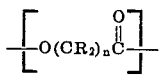

wherein R is of the group consisting of hydrogen and alkyl, with the proviso that no more than 3 R substituents are alkyl groups; wherein $n$ has a value of from 5 to 7; and wherein said A blocks represent from about 15 to about 85 weight percent of the ABA block polymer;

ii. a B block defined by the structural formula:

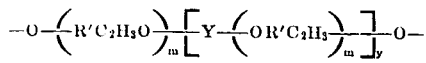

wherein R' is of the group consisting of hydrogen or lower alkyl of one to three carbon atoms; wherein $m$ is a number such that

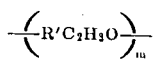

has an average molecular weight of at least about 1,000; wherein $y$ has a value of from 2 to 5; wherein Y represents the divalent group which results when both vicinalepoxy groups of an organic diepoxy compound are opened during the hydroxyl/oxirane reaction, said organic diepoxy compound being composed solely of carbon, hydrogen, and oxygen atoms, said oxygen being of the group consisting of oxirane oxygen, ether oxygen, ester oxygen, and mixtures thereof, at least a portion of said oxygen being in the form of oxirane oxygen; and wherein said B block represents from about 85 to about 15 weight percent of the ABA block polymer;

iii. wherein each terminal oxy moiety of the B block is individually connected to the terminal carbonyl moiety of an A block through a monovalent bond; and iv. wherein said block polymer has an average molecular weight of from about 4,000 to about 100,000.

2. The solid block polymers of claim 1 wherein the variable $m$ is a number such that

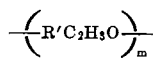

has an average molecular weight of from about 3,000 to about 15,000.

3. The solid block polymers of claim 2 wherein the R' substituent in the B block represents hydrogen.

4. The solid block polymers of claim 3 wherein the A blocks are characterized by the recurring unit shown below:

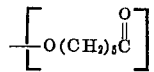

5. The solid block polymers of claim 4 wherein the organic diepoxy compound is di(epoxyalkyl) diether of a dihydric phenol 6. The solid block polymers of claim 5 wherein said di(epoxyalkyl) diether of a dihydric phenol is the diglycidyl diether of 2,2-bis(4-hydroxyphenyl)propane.

7. The solid block polymers of claim 5 wherein the variable $m$ is a number such that

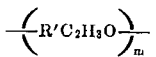

has an average molecular weight of from about 4,000 to about 8,000 and wherein the variable $y$ has a value of two.

* * * * *